J. H. Manny.

Harvester Cutter.

No. 291 Reissued Jan. 2, 1855.

UNITED STATES PATENT OFFICE.

JOHN H. MANNY, OF ROCKFORD, ILLINOIS.

IMPROVEMENT IN CUTTER-FINGERS OF HARVESTERS.

Specification forming part of Letters Patent No. 9,675, dated April 19, 1853; antedated December 9, 1852; Reissue No. 291, dated January 2, 1855.

*To all whom it may concern:*

Be it known that I, JOHN H. MANNY, of Rockford, in the county of Winnebago and State of Illinois, (formerly of Waddam's Grove, in the county of Stephenson and State aforesaid,) have invented a new and useful Improvement in the Cutting Apparatus of Machines for Mowing Grass or Grain, of which the following is a full, clear, and exact description, reference being had to the accompanying drawings, which form part of this specification, and in which—

Figure 1:
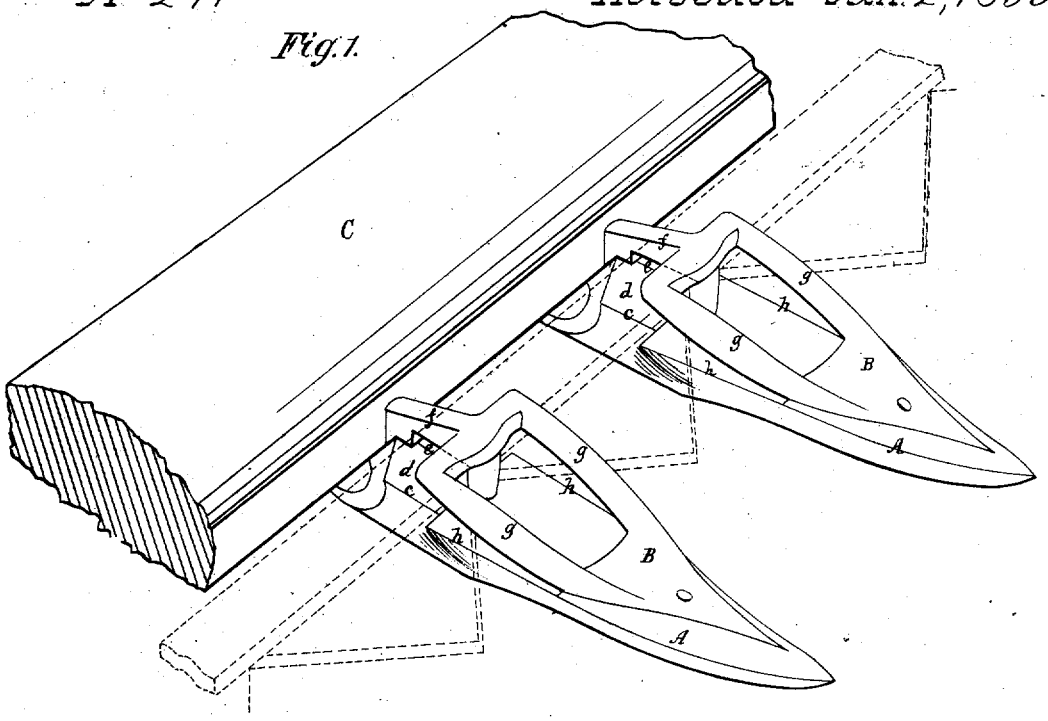
Figure 2:
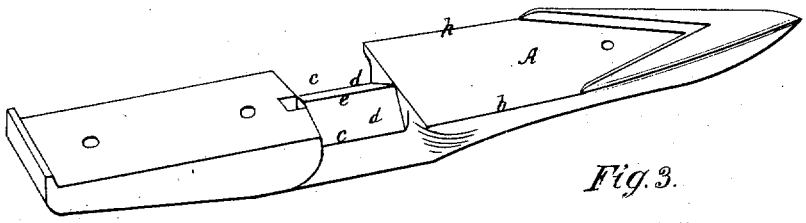
Figure 3:
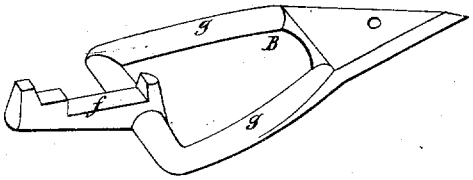
Figure 5:
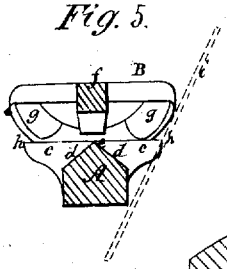
Figure 4:
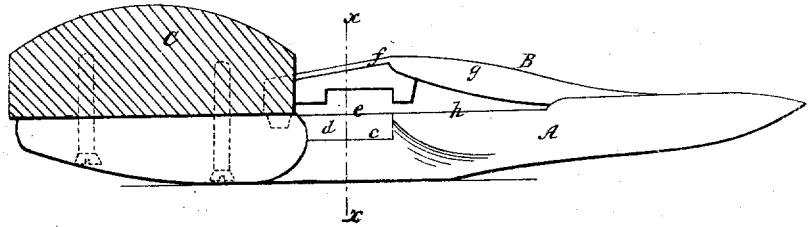

Figure 1 is a view in perspective of two of the fingers of a mowing-machine attached to the finger-bar, and showing in red lines the serrated cutter which plays back and forth through them. Fig. 2 is a view in perspective of the upper side of the under half of the finger detached. Fig. 3 is a similar view of the under side of the upper half of the finger. Fig. 4 is a side elevation of the finger and a section through the finger-bar, and Fig. 5 is a transverse section of the finger at the line *x x* of Fig. 4.

It is well known that the cutting apparatus of mowing-machines are not unfrequently rendered inoperative by the entanglement of wire-grass around the cutter and the lodgment of it, together with straw, grain, and grit, in the openings through the fingers which form the race or guide of the reciprocating cutter. To keep the cutter and fingers clear of all such impediments has long been a desideratum, which it is the object of my invention to secure.

Each finger, as represented in the drawings, consists of two distinct parts, but may be made in one piece. The lower part, A, is made the strongest and supports the upper part, B. The finger-bar C and the front and rear extremities of the fingers may be made in any convenient manner, as my improvements relate to that part of the finger through which the cutter plays and those parts immediately adjacent thereto. I shall therefore confine my description principally to those points in which the improvements are made.

The first of these improvements consists in narrowing the finger just in front of the finger-bar, where the stock of the knife plays, by a recess, *e*, on either side. The upper corners of the recess in the lower half of the finger are chamfered or beveled off, as shown at *d*, leaving a ridge, *e*, in the middle, so that, except at the middle of the finger, any fiber, grass, &c., that may be drawn under the knife will drop down on either side, leaving the bearing on the middle so narrow that the grass will be cut off or detached by the motion of the sickle-stock, and thus it will be impossible for wire-grass to accumulate, as it does in this part of fingers of other constructions.

If a recess be made in the shank of the finger beneath the knife-stock, instead of the ridge *e*, and projections from the under side of the knife-stock be arranged to play through these recesses, the fingers will be kept clear until a roll, bunch, or quantity of the wire-grass happens to enters the recess, when the resistance of the grass to displacement or being cut will be so great as to endanger the breaking of the projections on the under side of the stock of the knife, and very often the knife itself. By the peculiar shape I have given this part of the finger all the advantages of a transverse groove on the top of the finger are secured, and at the same time the entrance of rolls and the accumulation of wire-grass are effectually guarded against.

The under side of the shank *f* of the upper part, B, of the finger immediately over the part of the lower finger just described may be made of corresponding shape.

The upper part of the finger has the general form of an open isosceles triangle, with a shank, *f*, projecting outward from the middle of the base, the part of the inside of the triangle adjacent to the apex being filled or solid. The part of the lower half of the finger corresponding to the triangle of the upper part is also of triangular shape; but the triangle is more acute. Hence the sides *g* of the upper triangle overhang the edges *h* of the lower triangle, so that the grass must be inclined when borne by the knife against the fingers in such manner that it will receive a double drawing cut, the slant of the edge of the knife causing the draw in one direction and the slant of the grass against the upper and lower triangles causing the draw in the other direction, as seen by the portion of the inclined stem *i* in Fig. 5.

Many other advantages result from this construction of the finger; but it is deemed unnecessary to specify them, as they are sufficiently obvious.

What I claim as my invention, and desire to secure by Letters Patent, is—

1. Constructing the lower part of the finger or the upper, or both, with a recess on either side in front of the finger-bar, whereby the clogging of the cutting apparatus is effectually prevented, as herein described.

2. Constructing the finger so that the sides of its upper half will overhang those of its lower half, the cutter playing between the two, substantially as herein set forth.

3. Beveling the upper corners of the shank of the lower part of the finger so as to form a cutting-edge, *e*, thereon, in the position and for the purpose described.

In testimony whereof I have hereunto subscribed my name.

JOHN H. MANNY.

Witnesses:
P. H. WATSON,
F. G. DE FONTAINE.